(12) United States Patent
Franzén

(10) Patent No.: US 9,503,804 B2
(45) Date of Patent: Nov. 22, 2016

(54) BLUETOOTH HEADSET AND EAR UNIT

(71) Applicant: Bo Franzén, Nybro (SE)

(72) Inventor: Bo Franzén, Nybro (SE)

(73) Assignee: Bo Franzén, Nybro (SE)

( * ) Notice: Subject to any disclaimer, the term of this patent is extended or adjusted under 35 U.S.C. 154(b) by 0 days.

(21) Appl. No.: 14/647,552

(22) PCT Filed: Nov. 27, 2013

(86) PCT No.: PCT/SE2013/051400
§ 371 (c)(1),
(2) Date: May 27, 2015

(87) PCT Pub. No.: WO2014/084786
PCT Pub. Date: Jun. 5, 2014

(65) Prior Publication Data
US 2015/0312673 A1    Oct. 29, 2015

(30) Foreign Application Priority Data

Nov. 28, 2012 (SE) ...................... 1251346

(51) Int. Cl.
| | |
|---|---|
| *H04R 1/10* | (2006.01) |
| *H04M 1/60* | (2006.01) |
| *H04R 1/08* | (2006.01) |
| *H04W 4/00* | (2009.01) |

(52) U.S. Cl.
CPC ......... *H04R 1/1091* (2013.01); *H04M 1/6066* (2013.01); *H04R 1/08* (2013.01); *H04R 1/1016* (2013.01); *H04W 4/008* (2013.01); *H04M 2250/02* (2013.01); *H04R 1/1041* (2013.01); *H04R 1/1083* (2013.01); *H04R 2201/107* (2013.01)

(58) Field of Classification Search
CPC ............. H04W 4/008; H04M 1/6066; H04M 2250/02; H04R 1/1016; H04R 1/08; H04R 1/1091; H04R 2201/107
See application file for complete search history.

(56) References Cited

U.S. PATENT DOCUMENTS

| | | | |
|---|---|---|---|
| 2009/0208047 A1 | 8/2009 | Ngia et al. | |
| 2012/0063622 A1* | 3/2012 | Bruckhoff | A61F 11/008 381/328 |

(Continued)

OTHER PUBLICATIONS

ISA/European Patent Office, International Preliminary Report on Patentability, as completed and mailed Dec. 8, 2014 (total 15 pgs.).

(Continued)

*Primary Examiner* — Muhammad N Edun
(74) *Attorney, Agent, or Firm* — Barclay Damon, LLP

(57) ABSTRACT

The present invention refers to a headset with a Bluetooth device comprising an ear loud speaker (3) with connection means (4) for connection to a detachable ear unit (5, 5a, 5b). The Bluetooth device is equipped with an extra microphone (14) for receiving ambient sound, the microphone is provided with a sound attenuator (15). The invention also refers to an ear unit (5) for an ear loud speaker (3) of a Blue-tooth device. The ear unit (5) being adapted to be fixed onto the ear loud speaker (3) and to be inserted in the user's ear. According to the invention the ear unit (5) is made to be inserted in the auditory canal of the ear and to abut tightly against the auditory canal. The ear unit (5) has a through bore (6) which, when the ear unit (5) is inserted into the auditory canal, extends in the length direction of the auditory canal. The bore (6) is equipped with handle means (1 1, 13) for shape conformed fixation to the ear loud speaker (3).

15 Claims, 2 Drawing Sheets

(56) References Cited

U.S. PATENT DOCUMENTS

2012/0305329 A1* 12/2012 Keady ................ H04R 25/656
 181/135
2013/0315412 A1* 11/2013 Annunziato .......... G10K 11/16
 381/71.6

OTHER PUBLICATIONS

ISA/European Patent Office, International Search Report as completed Apr. 17, 2014 and mailed Jul. 17, 2014 (total 7 pgs.).

* cited by examiner

BLUETOOTH HEADSET AND EAR UNIT

CROSS-REFERENCE TO RELATED APPLICATIONS

This application is a national stage application under 35 U.S.C. §371 of PCT/SE2013/051400 filed Nov. 27, 2013, which claims priority of SE 1251346-1, filed Nov. 28, 2012, each of these documents being hereby incorporated by reference in their entirety.

AREA OF THE INVENTION

The present invention relates to a headset with a Bluetooth device comprising an ear loud speaker with connection means for connection to a detachable ear unit. The Bluetooth device is equipped with an extra microphone for reception of ambient sound, which microphone is equipped with a sound attenuator.

Furthermore the invention relates to an ear unit for an ear loud speaker at a Bluetooth device, which ear unit is adapted to be fixed on the ear loud speaker and to be inserted into the user's ear.

BACKGROUND OF THE INVENTION

A problem with ear loud speakers for a Bluetooth device is, in such a case that the ear unit is of a type keeping all ambient sound out, that one has no access to desired information from the ambient sound, e.g. the traffic related sound. It will involve a safety risk.

The connection means of an ear loud speaker is designed in a conventional way with the first part being cylindrical. The cylindrical part is adapted to be forced into a central through going opening in the ear unit and to be retained therein by a radially directed wall part of the ear unit opening, the wall part lies close to the end wall of the first part facing the second part. The conventional design often led to some difficulties when the loud speaker housing is to be introduced in the ear unit and fixed therein.

Furthermore an ear loud speaker of a Bluetooth device is traditionally connected to the user's ear by an ear unit being fixed to the loud speaker and introduced into the user's external ear. Commonly the ear unit is made from rubber or a similar material. It is removable fixed to the loud speaker and lies in a sealed way close to the entrance of the auditory meatus in the outer ear. Thereby the user can be listening to sound signals, such as speech and music received through the Bluetooth device. Even if the ear unit is somewhat sealed against sound flowing in from the surrounding, this sealing is far from optimum and in some cases quite unsatisfactory, as the arriving ambient sound is disturbing.

SUMMARY OF THE INVENTION

The purpose of the present invention is to avoid or at least to reduce the problems and drawbacks mentioned above.

This purpose is obtained according to a first aspect on the invention by a headset of the type according to the preamble of claim 1 having the characteristics mentioned in the characterizing part of the claim. Thus the Bluetooth device is equipped with a microphone for receiving ambient sound, wherein the microphone is provided with a sound attenuator.

Thanks to the special microphone the user of the headset can receive acoustic information from the surrounding also in such a case where the ear loud speaker is connected to an ear unit sealing off the sound. Furthermore, since the microphone is provided with a sound attenuator the sound level of the ambient sound can be restricted to a comfortable level. Thus the user does not need to take out the ear unit to perceive the ambient sound or to communicate with surrounding persons.

According to a preferred embodiment the sound attenuator is a passive sound attenuator attenuating incoming sound through the sound inlet.

A headset according to this embodiment has the advantage to be simple to produce and involves small risks for malfunction of the sound attenuator.

According to an alternative preferred embodiment the sound attenuator is an active sound attenuator adapted for attenuation of sound above a certain sound level and to let sound below this sound level to pass through.

This is a more sophisticated development which allows for a better regulated receipt of ambient sound. Detrimental and disturbing sound is attenuated while sound from the surrounding important to receive, e.g. traffic signals, and for communicative reasons, e.g. speech. The certain sound level mentioned ought to be so low that not only detrimental but also disturbing sound is attenuated. At the same time the sound level ought to be so high to allow relevant information to be delivered by the loud speaker.

According to a further preferred embodiment the Bluetooth device is equipped with a selector unit resettable between a first position and a second position, in the first position the microphone is activated to pass the sound whilst the communication by the Bluetooth device is blocked and in the second position the microphone is inactivated such that the sound is not passed through whilst the communication by the Bluetooth device is activated.

The lock function of the microphone may be applied irrespective of if it is equipped with a passive or an active sound attenuator. By means of the selector unit it will be possible to, when a demand appears for quite a disturbance free communication, almost completely shut off the ambient sound. As soon a call through the headset is finalised the microphone can be activated once more. Thus, this development will combine the best thinkable communication possibility with the higher safety it will be to have access to ambient sound except for just during a call.

According to a further preferred embodiment the selector unit is integrated in a selector means for a reset between on one hand communication through the Bluetooth device and on the other hand for listening to a playback device, such as e.g. a music recorder, connected through the Bluetooth device.

It will simplify the operation of the headset in that the selection possibility normally to be found for selection between a call and music listening, i.e. by pressing the key "lift the handset" and the key "replace the handset" respectively, at the same time can be used for inactivate and activate the microphone respectively.

Another alternative covered by the field of the invention is that these measures are made with separate key sets.

According to an alternative embodiment the connection means is formed by a loud speaker housing, the loud speaker housing having a first part facing the ear unit and a second part placed close to the first part and which extends from the first part in a direction to the Bluetooth device, wherein the first part has a larger diameter than the second part, the first part of the loud speaker housing has a decreasing diameter in the direction from the second part to the ear unit.

Due to the decreasing diameter it will be easier to introduce the loud speaker housing in the ear unit as the decreasing part is easier to put in behind the retaining wall part inside the opening of the ear unit.

According to a preferred embodiment the first part has a conical design.

The conical design is optimal with respect to the action for its introduction behind the retaining wall part. Furthermore it is a preferable design with respect to the production technique.

According to a further preferred embodiment the headset is provided with an ear unit to be inserted in the user's auditory canal for sound tight abutment against the auditory canal.

By such an ear unit a much more effective shielding of the ambient sound is obtained which otherwise can disturb the communication and other listening through the headset. Conventional ear units of headsets are made to be firmly forced against the ear without to be forced into the auditory canal and result in that disturbing sound is introduced. The headset according to this embodiment is favourably equipped with a sound inlet having a sound attenuator for regulated receipt of ambient sound.

According to further preferred embodiments the headset is provided with an ear unit according to the present invention as mentioned below, especially according to anyone of the preferred embodiments thereof. In such away advantages are obtained of corresponding nature as mentioned below for the inventive ear unit and the preferred embodiments thereof.

According to a further preferred embodiment of the headset it comprises two ear loud speakers.

This results in an improved undisturbed communication through the headset. The communication may be either wireless or through a sound cable. Also the second ear loud speaker can be equipped with a microphone for ambient sound.

The purpose set up is obtained according to a further aspect on the invention by an ear unit of the type according to the preamble of Claim 13 having the characteristics mentioned in the characterizing part of the claim. Thus the ear unit is made to be inserted in the auditory canal of the ear and to abut tightly against the auditory canal, the ear unit has a through bore which, when the ear unit is inserted into the auditory canal, extends in the length direction of the auditory canal and is equipped with handle means for shape conformed fixation to the ear loud speaker.

Due to that the ear unit is inserted in the auditory canal there is obtained a much more effective sealing against sound from the surrounding compared to an ear unit being applied only to the external ear. Thereby the listening to the sound through the ear loud speaker is less disturbed and the user gets a better perception of the signals.

Due to that the through bore is equipped with the shape conformed handle means it is guaranteed that the loud speaker is remained seated in the ear unit.

In the present application there are used expressions like "inner", "outer", "inside", "outside" etc. and "axial" and "radial". These expressions are relating to the ear unit when placed in the user's auditory canal, which then is approximated to a circular cylinder. Naturally inwards denotes the direction to the brain and outwards denotes the direction out to the Bluetooth device. This unless nothing else is explicitly mentioned, e.g. "radially inwards".

According to a preferred embodiment of the ear unit the handle means comprises a abutment surface facing the inside of the auditory canal and extending in a radial direction inwards from the periphery of the bore.

In such a way the handle means is particularly adapted to the shape of a Bluetooth device developed as a standard. The standardized Bluetooth device namely involves an outside housing being substantially cylindrical and having a part of reduced diameter adjacent an inner part with a larger diameter and an outer part with a smaller diameter. At each one of the adjacent parts a radial wall is formed in the housing. The abutment surface of the ear unit will then be able to abut against that wall of the loud speaker housing which is close to the inner part. Then the shape conformed fixation is effective and safe.

Preferably the abutment surface extends along the whole periphery of the bore. Thereby the abutment surface is circumferential which maximizes the retaining force as well as the sealing against outside sound.

According to a further preferred embodiment the bore is provided with a radially inwards directed flange, where the abutment surface is formed by the side of the flange facing the inside of the ear.

This represents from production point of view a simple way to obtain the abutment surface and produces further power to the retaining force.

Preferably the flange has a substantially constant inner diameter with an axial width of 0.5-2 mm.

In that case the flange has an axial thickness sufficient to give a satisfactory resistance to unfastening of the ear unit. The retaining force will be larger the thicker the flange is and therefore it is preferable that it is almost 2 mm. About 2 mm is the top limit for having the flange to fit in the groove mentioned above in the groove of the standardized loud speaker housing. Furthermore the sealing against sound received from the surrounding will be better the thicker the flange is.

Preferably the flange has an inner diameter within the interval 4.3-4.7 mm and an axial width within the interval 1.8-2.2 mm, the part of the bore laying axially outside the flange has an inner diameter within the interval 5.8-6.2 mm and the part of the bore laying axially inside the flange has an inner diameter within the interval 5.8-6.2 mm, at least closest to the flange a distance of at least 2 mm.

With these measures the bore of the ear unit is adapted in an optimal way to be fastened to a Bluetooth device having a standard housing. The dimensions of the housing are namely such that the groove has a diameter of about 4.5 mm and a width of about 2 mm and the part of the housing facing the ear has a diameter of about 6 mm and a width of about 2 mm. Most preferable is if those measures of the bore are in line with the corresponding measures of the housing. Thereby the most thinkable best fixation and the most thinkable best attenuation of the sound from the surrounding are obtained.

According to a further preferred embodiment the flange facing the side of the Bluetooth loud speaker extends conically diverging outwards along at least for a part of the bore length to its outer end.

The taper facilitates changing of the ear unit in that it will be easier to bring the ear unit onto the housing of the loud speaker. It involves a corresponding facilitation of its application as a headset according to the present invention, where the first part has a similar shape. Especially the application is facilitated when the said part of the ear loud speaker as well as the said flange of the ear unit is tapered.

According to a further preferred embodiment the ear unit at the outside has at least an outside flange to be placed against the auditory canal, which outside flange is made of elastic material, such as e.g. rubber.

The elastic outside flange will, when the ear unit is introduced in the auditory canal, with its outer periphery abut against the auditory canal, wherein the elasticity enables the ear unit, at the outside periphery thereof, to be somewhat bent against the auditory canal. Thereby a very effective attenuation of the sound is obtained. Preferably the ear unit has two, three or four such outside flanges. Also a greater number of outside flanges are conceivable.

According to a further preferred embodiment at least one outside flange, preferably all of them, has a radially outward directed part and a part substantially axially directed from the outer periphery of the outside flange.

The axially directed part improves the sound attenuation further due to ins creasing the contact surface of the outer flange against the auditory canal.

According to a further preferred embodiment the ear unit comprises a body made from a material being compressible and re-expansible to make its introduction in and sealed contact against the auditory canal possible.

An earplug of a compressible/re-expansible material to be introduced in the auditory canal is known per se and is normally used to lock out the sound all together. Usually when used they have no open through canal for the sound. They are not possible to connect to a Bluetooth loud speaker with standard connection and of course have no handle means. By its compressibility it is easy to press together when introduced in the ear. In place it will expand whereby one obtains an effective sound attenuation function along all the body inside the auditory canal.

At this embodiment it may be suitable to provide the bore with a lining which extends along at least a part of the axial extent of the bore, the lining being of another material than the body, which other material has a minor elasticity than the body.

Thereby the walls of the bore have a relatively better resistance to compression than the body of the ear unit. By that it is secured in a simple way that an open passage extends through the bore when the body is forced together when introduced in the auditory canal.

The preferred embodiments of the invention mentioned above are presented in the dependent claims. It may be understood that further preferred embodiments can be the result of every possible combination of the preferred embodiments mentioned above and every possible combination thereof and the distinctive features mentioned in the description given below.

The invention will be explained more in detail by the description of samples thereof given below and by reference to the attached drawing figures.

DETAILED DESCRIPTION OF THE INVENTION

Figure 1:
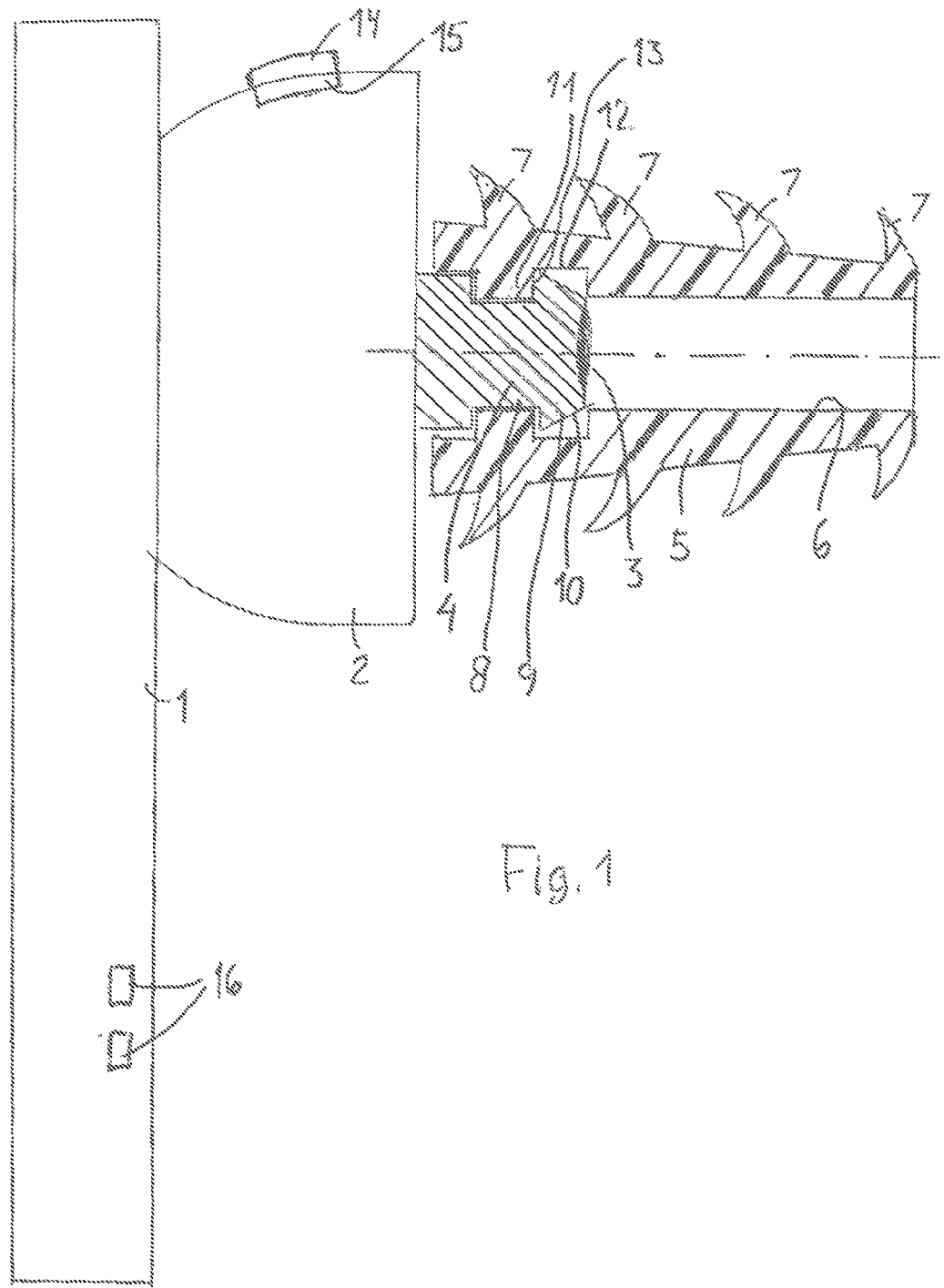
FIG. 1 shows a view partly from the side and partly in section of a headset according to the invention.

FIG. 1 shows partly in cross section and partly in section a headset according to the invention provided with an ear unit according to the invention. Thus the connection means of the headset and the ear unit are shown in a section through the centre line of the headset and the ear unit.

The headset 1 is provided with a loud speaker cabinet 2, to which the loud speaker 3 is fixed by a loud speaker housing 4. The loud speaker housing 4 has an outer line making it functioning as a connection means 4 for an ear unit 5. The ear unit 5 is detachable connected with the connection means 4 of the headset. The ear unit has a through bore 6 extending in the length direction thereof. At the end facing the headset the bore 6 has a geometry for co-operation with the connection means 4 of the headset such that the ear unit 5 can be connected thereto and be retained thereof.

The ear unit 5 is adapted to be inserted in a user's auditory canal and is provided with radially protruding outer flanges 7. The ear unit 5 is made of rubber or another elastic material with similar properties. When it is introduced in the auditory canal its outer flanges 7 will be somewhat deformed and abut in a sealing manner against the wall of the auditory canal.

The connection means 4 of the headset has a part 9 near the ear unit 5 with a larger diameter than a part 8 just outside thereof. The ear unit 5 has a complementary shape at the part of the bore 6 closest to the headset. Thus the part 12 of the bore close to the headset has somewhat larger diameter than the rest of the bore 6. At the part 12 having the larger diameter there is an inwardly directed flange 11, which at the border to the part 12 with the larger diameter forms a abutment surface 13 on the flange 11.

When the ear unit has been applied to the connection means 4 the abutment surface 13 will be in contact with the outer wall of the connection means inner part 9. Thereby a shape corresponding joint is obtained between the connection means 4 and the ear unit 5, such that they are kept together at a moderate separating force.

The inner part 9 of the connection means has an outside outline in the shape of a cone 10. When the connection means is to be introduced in an ear unit 5, i.e. the parts are separated from each other, the inner part 9 of the connection means is forced from the outside against the inwards directed flange 11 of the ear unit and thereby pushes it aside. Although the ear unit is made of rubber this can be difficult. Through the cone shape of the inner part 9 of the connection means this will be facilitated.

On the loud speaker cabinet there is microphone 14 arranged for receiving sound from the surrounding. The microphone 14 is provided with a sound attenuator 15. The sound attenuator 15 may be of a passive type, i.e. it attenuates all the incoming sound. Alternatively the sound attenuator 15 is an active sound attenuator, which un-attenuated lets sound under a certain sound level through but attenuates the sound above that level.

The Bluetooth device 1 is provided with a selector unit 16 in the shape of two keys. Thereby the microphone 14 can be turned off when necessary, as one wants to communicate through the headset. The key set can be the same as the one being used to change between communication and music listening.

Figure 2:
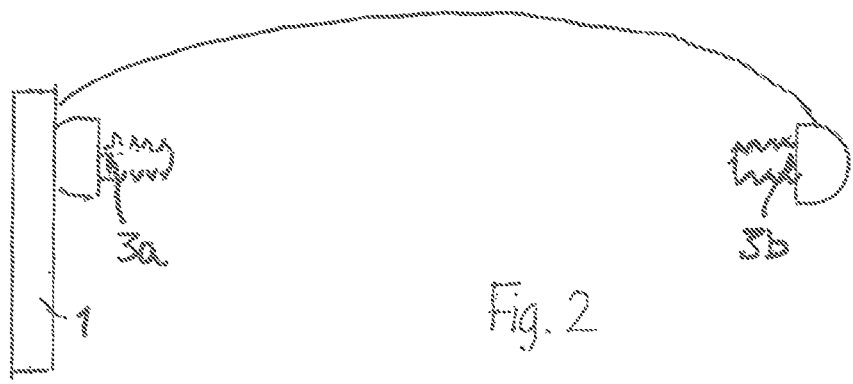
FIG. 2 shows a side view of a second embodiment according to the invention.

FIG. 2 shows a headset according to the invention being provided with two ear loud speakers 3a, 3b. They are connected with a sound cable but alternatively can be wireless connected.

Figure 3:
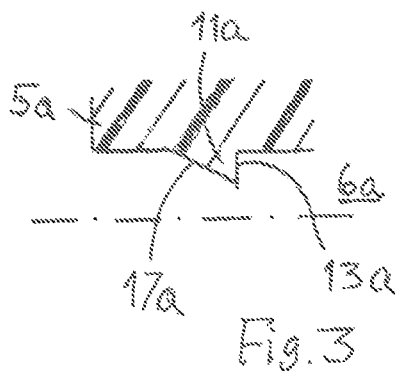
FIG. 3 shows a length section through a first detail of an ear unit according to the invention.

FIG. 3 shows an alternatively accomplishment of an ear unit 5a according to the invention. The figure shows that part of the ear unit 5 being closest to the loud speaker. The outwards turned side of the flange 11a, which with its inwards turned side forms the abutment surface 13a to the innermost part 9 of the loud speaker housing 4 (compare FIG. 1), has in this example the shape of a cone 17a. The purpose is to facilitate the passage of the loud speaker housing 4 past the flange 11a when the ear unit 5a is to be fixed to the loud speaker housing 4. With advantage the design of the flange 11a can be combined with the loud speaker housing which also has a cone designed end 10.

Figure 4:
FIG. 4 shows a length section through a second detail of an ear unit according to the invention.

FIG. 4 illustrates an alternative embodiment of the outer flanges 7a of the ear unit. Each one of the flanges 7a has substantially a radially directed part 71 protruding from its pipe formed part. At the outer end of the radial part 71 there is a substantially axially directed part 72. The purpose is to obtain a larger contact surface against the user's auditory canal.

Figure 5:
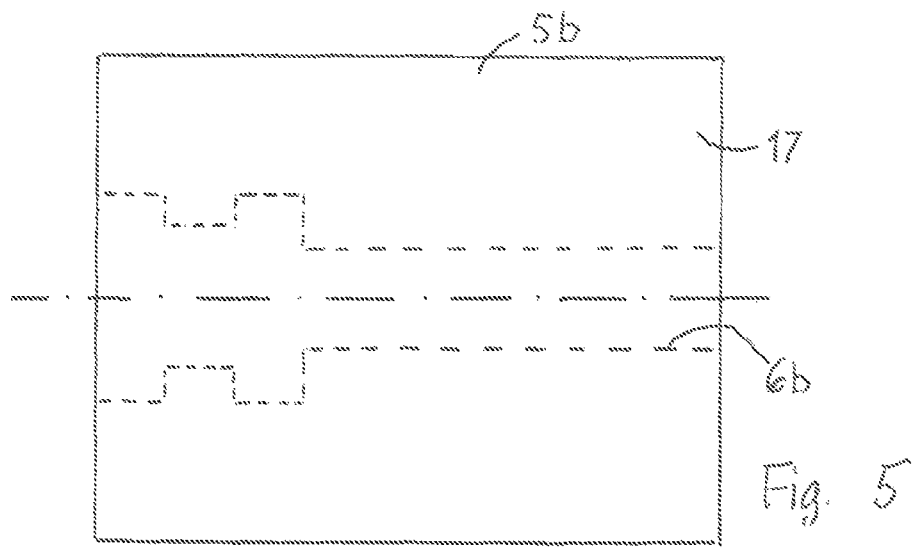
FIG. 5 shows a side view of an ear unit according to a further embodiment of the invention.

FIG. 5 shows a further alternative embodiment of an ear unit according to the invention. In this case the ear unit 5b consists of a body 17 made of a material being compressible and then re-expansible, e.g. foamed plastic. It has a central through bore 6b for the passage of the sound from the loud speaker. At the end facing the loud speaker the bore has a similar profile as the bore of the ear unit in FIG. 1. With advantage the bore 6b can be coated with a more stiff material than the rest of the body 17. When introduced in the auditory canal the body is in first hand strongly compressed such that it can be introducible. Then at place it will expand such that it will be in contact with the auditory canal along the whole length thereof.

The invention claimed is:

1. A headset with a Bluetooth device comprising:
an ear loud speaker with connection means for connection to a detachable ear unit adapted to be inserted into the auditory canal of the ear for sound tight abutment against the auditory canal, wherein the Bluetooth device is equipped with a microphone for receiving ambient sound, wherein the microphone is provided with a sound attenuator, and wherein the connection means is formed by a loud speaker housing, the loud speaker housing having a first part facing the ear unit and a second part placed close to the first part and which extends from the first part in a direction towards the Bluetooth device, wherein the first part has a larger diameter than the second part, wherein the first part has a decreasing diameter in the direction from the second part towards the ear unit, the Bluetooth device being equipped with a selector unit resettable between a first position and a second position, in the first position the microphone is activated to pass the ambient sound whilst the communication by the Bluetooth device is blocked and in the second position the microphone is inactivated such that the ambient sound is not passed through whilst the communication by the Bluetooth device is activated.

2. A headset according to claim 1, wherein the sound attenuator is a passive sound attenuator attenuating incoming sound through the microphone.

3. A headset according to claim 1, wherein the sound attenuator is an active sound attenuator adapted for attenuation of sound above a certain sound level and without attenuation to let sound below this sound level to pass through.

4. A headset according to claim 1, wherein the selector unit is integrated in a selector means for a reset between on one hand communication through the Bluetooth device and on the other hand for listening to a playback device, connected through the Bluetooth device.

5. A headset according to claim 4, wherein the playback device is a music recorder.

6. A headset according to claim 1, wherein the first part has a conical design.

7. A headset according to claim 1, wherein the headset comprises two ear loud speakers.

8. A headset according to claim 1, further comprising an ear unit adapted to be fixed onto the ear loud speaker and to be inserted in the auditory canal of the ear and to abut tightly against the auditory canal, the ear unit having a through bore which, when the ear unit is inserted into the auditory canal, extends in a length direction of the auditory canal and which the bore is equipped with a gripping means for shape conformed fixation to the ear loud speaker.

9. A headset according to claim 8, wherein the gripping means comprises an abutment surface facing the inside of the auditory canal and extending in a radial direction inwards from the periphery of the bore.

10. A headset according to claim 9, wherein the bore is provided with a radially inwards directed flange, wherein the abutment surface is formed by the side of the flange facing the inside of the ear.

11. A headset according to claim 8, wherein the flange facing the side of the Bluetooth loud speaker extends conically diverging outwards along at least of a part of the bore length to its outer end.

12. A headset according to claim 8, wherein the ear unit at its outside has at least an outside flange to be placed against the auditory canal, the outside flange being made from an elastic material.

13. A headset according to claim 12, wherein at least one outside flange has a radially outward directed part and a part substantially axially directed from the outer periphery of the outside flange.

14. A headset according to claim 12, wherein each outside flange has a radially outward directed part and a part substantially axially directed from the outer periphery of the outside flange.

15. A headset according to claim 8, wherein the ear unit comprises a body made from a compressible and re-expansible material to make its introduction in and sealed contact against the auditory canal possible.

* * * * *